Oct. 5, 1965  A. H. DALL  3,209,498
MACHINE TOOL RIGIDITY CONTROL MECHANISM
Filed July 9, 1963  3 Sheets-Sheet 1
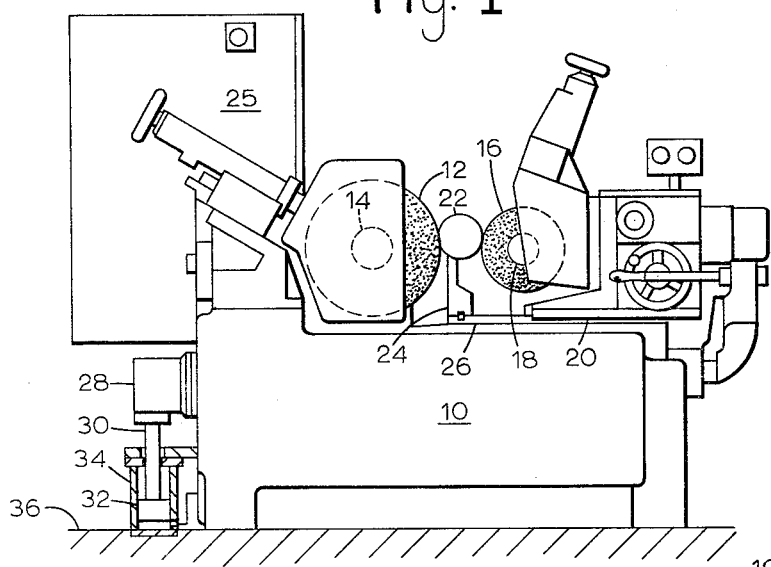
Fig. 1
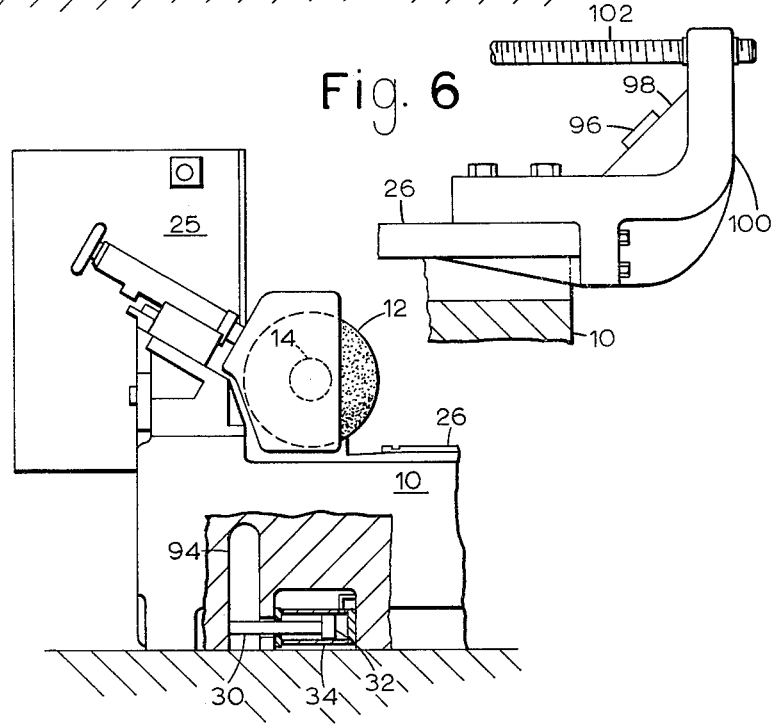
Fig. 6
Fig. 2
INVENTOR.
ALBERT H. DALL
BY
Howard T Keiser
& Jack J. Earl
ATTORNEYS

United States Patent Office 3,209,498
Patented Oct. 5, 1965

3,209,498
MACHINE TOOL RIGIDITY CONTROL
MECHANISM
Albert H. Dall, 2628 Briarcliff, Cincinnati 13, Ohio
Filed July 9, 1963, Ser. No. 293,675
16 Claims. (Cl. 51—165)

The present invention relates to a machine tool and more particularly to an automatic control mechanism included in a centerless grinding machine to compensate for the pinchout of workpieces during through-feed grinding operations.

The lack of infinite rigidty in a machine tool presents problems the solutions to which often are expensive or impractical to apply to the machine. For example, the most obvious solution to a lack of sufficient rigidity is to make the machine more massive and thus stronger. However, the cost of this solution in terms of materials, space and convenience often rules it out as a satisfactory solution. An example of the problem is found in centerless grinding machines adapted to perform a through-feed operation to very close tolerances. Continuous operation, through-feed grinding processes employing wide grinding wheels are commonly performed on large lots of short cylindrical workpieces. By this process, rough workpieces are moved into one end of the grinding throat between previously positioned grinding and regulating wheels. The finished workpieces are discharged from the other end of the grinding throat, having been moved therethrough by an axial thrust force produced during grinding and resulting from the relative orientation of the grinding and regulating wheels. In a continuous operation of this sort, the most efficient use of the grinding machine is achieved by feeding the workpieces to the machine in a continuous and uninterrupted string such that the grinding throat is filled end to end except at the start and finish of the operation. While the grinding throat is filled, the operation produces nearly constant stresses within the machine which result in a slight separation of the grinding and regulating wheels due to flexing of the machine structure. When the throat is not filled, these stresses are reduced and the wheels move back together slightly. This movement of the wheels apart during heavy grinding loads and together during light grinding loads is sometimes referred to as "pinchout" and occurs since the machine structure has less than infinite rigidity. As a result of this slight change in wheel spacing, the size of workpieces operated upon during periods of reduced stress or grinding load is somewhat smaller. Automatic loading mechanisms normally are utilized to insert the workpieces into the grinding machine in a continuous flow. These loaders are subject to intermittent failures and jamming and therefore sometimes allow an interruption of the continuous flow of workpieces in the process. Thus some workpieces are produced that are slightly smaller than the workpieces produced during normal, uninterrupted feed. If the finished workpieces are to conform to very close tolerances such as a range of deviation of only a few ten thousandths of an inch, these smaller workpieces very probably are scrap and must be rejected. In a high volume continuous operation, finding these smaller workpieces may involve the expensive process of accurate measurement of each workpiece. This is undesirable, of course. It also should be pointed out that the continuous feed of workpieces which have a substantially varying unfinished size range will also produce the varying load stresses within the grinding machine with the resulting variation of finished part size the same as in an intermittent feed situation.

It is therefore the object of this invention to provide a centerless grinding machine with an automatic compensation mechanism to reduce the size variation of finished workpieces even though the workpieces are intermittently supplied to the machine or are of substantially varying size before presentation to the machine for grinding.

It is also an object of this invention to provide a mechanism for use in a machine tool by which the machine tool can be provided with the effect of infinite rigidity.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention utilizes a fluid actuated piston mechanism variably to apply compensating stresses in a machine tool tending to offset the effect of stresses therein resulting from the reaction forces of a cutting operation. The compensating stresses are produced in response to an electrical signal indicating the magnitude of reaction forces and stresses in the machine in a manner such that the algebraic sum of stresses, resulting from these reaction forces and compensating stresses in the machine tends to be constant over a predetermined range of operation. A clear understanding of the present invention can be obtained from the following detailed description in which reference is made to the attached drawings wherein:

FIG. 1 is a front elevation of a centerless grinding machine with pinchout compensation.

FIG. 2 is a partial front elevation of a centerless grinding machine with an alternate arrangement of the compensation mechanism of this invention.

FIG. 6 is a partial view of the right side portion of the machine of FIG. 1.

Figure 3:
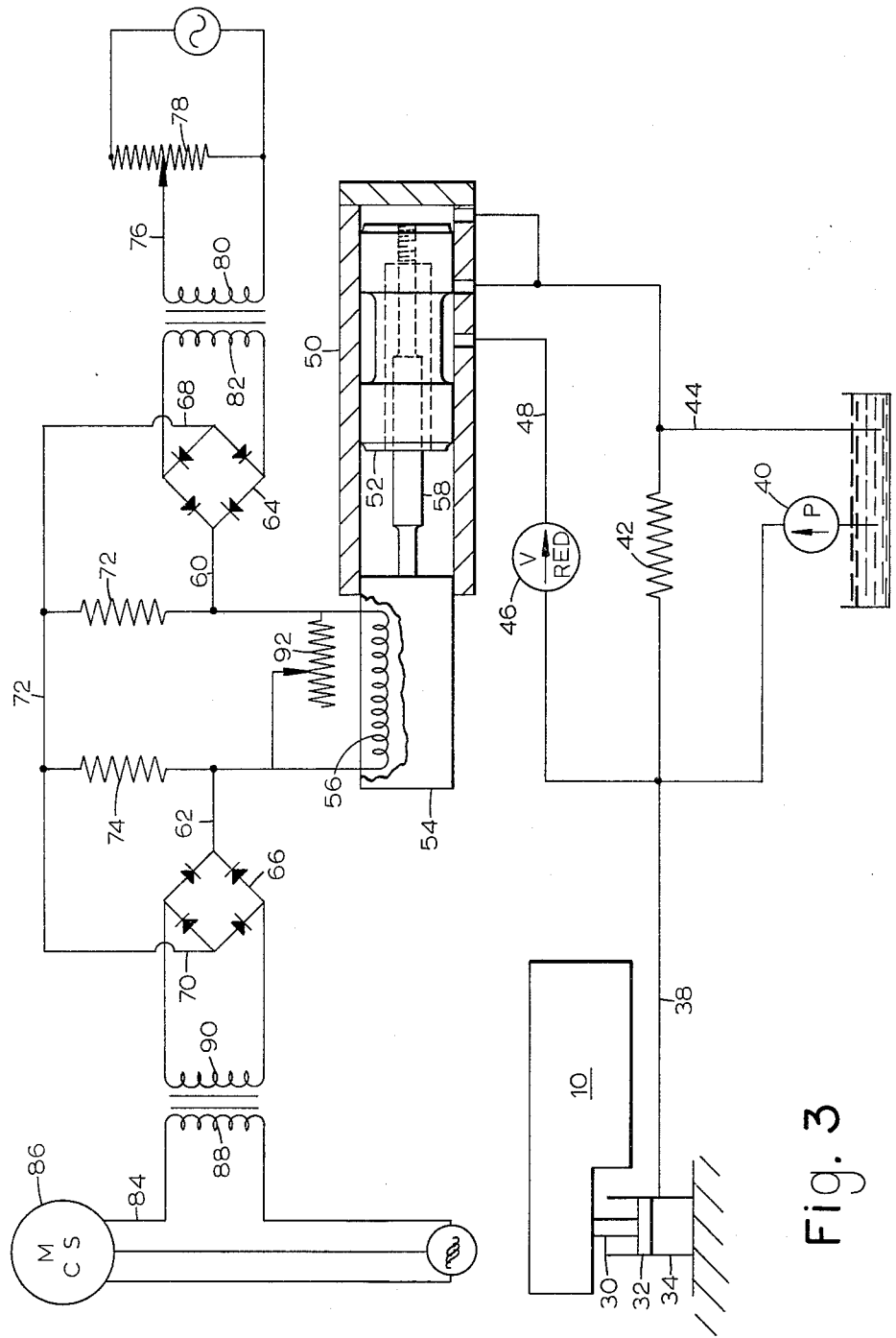
FIG. 3 is a schematic electrical and hydraulic control circuit for the described machines of FIGS. 1 and 2.

As shown in FIG. 1, a centerless grinding machine is comprised of a base 10 on which a grinding wheel 12 fixed to a rotatable spindle 14 is supported in a spaced relation from a regulating wheel 16. The regulating wheel 16 is also fixed to a rotatable spindle 18 carried by a slide 20 for movement toward and away from the grinding wheel 12. During a grinding operation, a workpiece 22 is supported on the inclined top surface of a blade support 24 that is attached to a sub-slide 26 which in turn is slidable on the base 10 toward and away from the grinding wheel 12 to afford positioning of the blade support 24 close to the grinding wheel 12 after which it is securely clamped to the base 10. The slide 20 on which the regulating wheel 16 is received is slidable on the sub-slide 26 but remains in an adjusted position thereon during a grinding operation. The workpiece 22 is held on the top of the blade support 24 and against the grinding wheel 12 by the regulating wheel 16. The grinding wheel 12 is rotated at a high rate of speed to perform the metal cutting while the regulating wheel 16 is rotated slowly to hold the workpiece 22 against the grinding wheel 12 and to govern the speed of rotation of the workpiece 22 such that it does not pick up the peripheral speed of the grinding wheel 12. The space between the grinding and regulating wheels 12, 16 above the blade support 24 can be termed the throat of the grinding machine in which the grinding operation is performed. The regulating wheel 16 is inclined slightly away from the horizontal direction such that axis of rotation is not parallel to that of the grinding wheel 12 and a through-feed thrust is produced on workpieces received in the throat in a well known manner. Also shown in FIG. 1 is the electrical control cabinet 25 in which the control circuits for the machine's operation are contained.

Figure 4:
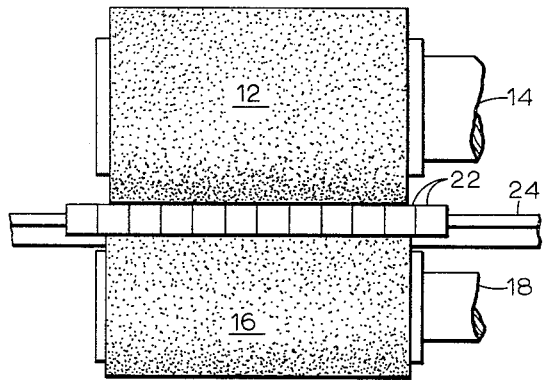
FIGS. 4 and 5 are simplified plan views of the grinding throat of a centerless grinder such as the machines of FIGS. 1 and 2 to illustrate the occurrence of different grinding loads therein.
Figure 5:
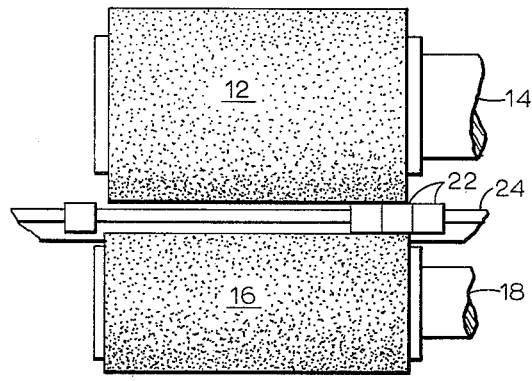

The throad of a wide wheel application of the centerless grinding machine is shown in FIGS. 4, 5 with the grinding and regulating wheel axis parallel to simplify the illustration. The grinding wheel 12 is oriented along one side and the regulating wheel 16 is along the other side. Both wheels 12, 16 are mounted on and rotated with respective spindles 14, 18. The blade support 24 extends between the wheels 12, 16 and, as shown in FIG. 4, supports an unbroken row of workpieces 22 through the throat during normal operation. In this normal operation, if each of the workpieces 22 has about the same amount of metal to be removed therefrom and if the row of workpieces is not interrupted, it is apparent that nearly constant reaction forces due to the grinding load are produced between the workpieces 22 and the wheels 12, 16 tending to separate the wheels. These forces create stresses in the machine structure supporting the wheels 12, 16, these stresses including a bending moment in the base 10 of the machine. The reactive forces applied to the machine during its operation can be considered as negative in their direction of magnitude and the stresses resulting therefrom can also be termed negative for purposes of this description. If the supply of workpieces 22 is interrupted and the grinding of the remaining workpieces in the throat continues as in FIG. 5, it can be observed that the reaction forces are much reduced in magnitude since the grinding wheel 12 is removing stock from fewer workpieces 22 at one time than in the normal condition represented by FIG. 4. When the feed of workpieces 22 is resumed, the normal conditions will not again occur until the throat is full as in FIG. 4. Thus, the last few workpieces 22 before a work feed interruption and the first few after a work feed resumption are ground when the negative forces between the wheels 12, 16 and the stresses within the machine are lower to allow the wheels 12, 16 to spring back and move slightly together.

The grinding machine in FIG. 1 has a rigid member 28 fixed to and extending from one side of the base 10. The member 28 is engaged by a piston rod 30 extending from a piston 32 slidably received in a cylinder 34 bearing at its lower end directly against the floor 36 on which the machine base 10 is resting. Fluid under pressure supplied below the piston 32 forces the rod 30 upward tending to lift one end of the grinder. This lifting force at the end of the machine tends to bend the base 10 in the opposite direction. That is to say, the lifting force tends to bend the base 10 in a direction such that the grinding wheels 12, 16 tend to be moved together. This stressing of the machine to tend the wheels together, being opposite to the grinding stresses which have been termed negative, are then positive compensation stresses.

In FIG. 3, an electro-hydraulic circuit is shown by which fluid is supplied to the cylinder 34 below the piston 32 in direct relation to the grinding load of the machine so that as the stresses separating the wheels 12, 16 are increased, the compensating stresses in the base 10 closing the wheels 12, 16 together are increased and the algebraic sum of the stresses tends to remain constant over a preset range and a smaller variation of wheel spacing is achieved between low and full grinding load conditions. It has been found that the reaction forces acting radially on the grinding and regulating wheels bear a nearly constant ratio to the reaction forces thereon acting tangentially. The motor load signal is a direct reflection of the tangential load and therefore can be used to indicate the radial forces which are the forces that tend to separate the wheels. As shown, a hydraulic fluid pressure supply line 38 from a pump 40 supplied fluid under pressure to the cylinder 34. The pressure line 38 is also connected to one end of a fixed fluid resistance 42 the other end of which is connected directly to a low pressure return duct 44. The pressure line 38 also is connected through a pressure reducing valve 46 and fluid line 48 to a servo-type rate valve 50. A plunger 52 in the valve 50, when positioned as shown, is in its fully closed condition and the fluid in the line 48 is isolated from the low pressure duct 44 which also connects with the valve 50. Therefore, in the condition shown, the fluid pressure in the line 38 is dependent solely upon the pump 40 and the discharge flow through the resistance 42 which is the highest pressure condition available and the piston 32 is urged upward with its maximum force. It can be seen that the shifting of the plunger 52 rightward from the position shown to its fully open condition connects the line 48 to the return duct 44 in a nearly unrestricted manner to create a parallel fluid path from the line 38 to the return duct 44 bypassing the resistance 42. Consequently the pressure in the line 38 will drop to its lowest value to produce very little upward force on the piston 32. The plunger 52 is positionable in any condition between fully closed and fully open to produce an infinitely varying restriction in the fluid bypass path with the resulting infinitely variable pressure range between the highest and lowest values corresponding to the fully closed and fully open conditions in the valve 50. The pressure reducing valve 46 is included in the fluid path to the servo-valve 50 to make the fluid pressure change at the line 38 linear over the operating range of the system, that is to make the pressure in the line 38 follow directly the magnitude of the shift of the plunger 52 between its fully open and fully closed positions.

The plunger 52 is positioned in the valve 50 by the operation of a torque motor 54 which includes an energizing coil 56 and an axially movable and resilient shaft 58. The axial position of the shaft 58 is determined by the direction and amount of current flow through the coil 56 in a well known manner and a detailed description of the torque motor 54 is not deemed necessary. The shaft 58 is in threaded engagement at its outer end with the plunger 52 to hold the plunger in a position corresponding to the level of energization of the torque motor coil 56. The level of energization of the coil 56 is dependent upon the potential difference between a pair of output terminals 60, 62 of a pair of independently excited diode bridge rectifiers 64, 66. The terminals 60, 62 are of similar polarity. The other direct current terminals 68, 70 of the rectifiers are connected directly together by a conductor 72. Each of the rectifiers 64, 66 has a load resistance 72, 74, respectively, connected from the common conductor 72 therebetween to the output terminals 60, 62. The potential at the output terminal 60 with respect to the common line 72 is determined by the adjustment of a wiper contact 76 which couples a selected alternating current potential from a resistance element 78 to a transformer primary 80 energizing a secondary 82 connected across the bridge rectifier 64. The potential at the terminal 62 is determined by the current flow through one of the power supply lines 84 by which a constant speed motor 86 driving the grinding wheel spindle 14 is energized. An alternating current signal proportional to this current flow in the line 84 is coupled from a primary inductive winding 88 in that line to a secondary winding 90 that is connected across the rectifier bridge 66. As the load on the motor 86 increases, both the current in the line 84 and the potential across the winding 88 increase proportionally. The load on the motor 86 is an indication of the grinding load and is proportional to the reaction forces tending to separate the wheels, i.e., as greater grinding reaction forces are developed between the wheels 12, 16 and the workpieces 22, more current will be required to operate the motor 86 at a constant speed. As the potential across the winding 88 increases, the potential at the terminal 62 rises with respect to the common line 72.

In utilizing the described control circuitry to produce a compensating force to resist the stress within the machine due to grinding reaction forces, the wiper contact 76 is set to produce a potential at the terminal 60 which will cause a current flow through the coil 56 of such a magnitude and direction that the shaft 58 is pushed rightward to hold the plunger 52 in the fully open condition while the spindle motor 86 is run with no grinding reaction forces acting against the grinding wheel 12. By making the adjustment with the motor 86 rotating the grinding wheel 12 under no load condition, the normal idle load of the motor 86 has no effect on the control. Now as a workpiece 22 is inserted into the grinding throat, the grinding forces between the wheels rise and the load on the motor 86 increases. The potential at the terminal 62 rises toward the potential at the terminal 60 to reduce the current flow through the coil 56. This results in a movement of the shaft 58 leftward and the valve plunger 52 moves toward its fully closed condition thus increasing the pressure of fluid supplied to the cylinder 34 to produce a greater compensating force. The wiper contact 76 can be set at a position to produce an overshoot condition of the plunger 52 prior to grinding, that is, the potential at the terminal 60 is caused to be greater than that required to operate the torque motor 54 to hold the plunger 52 in the position of just producing the fully open condition. This raises the range of grinding loads in which the valve 50 is operated to increase the compensating stresses from the minimum value in response to the load signal at the terminal 62 and thus increases the grinding load of the machine for which the maximum compensation force is produced. The setting of the wiper 76 at a position where the valve 50 is not fully open under no load conditions reduces the load range through which the control of compensation force is achieved. Variable amounts of a shunt resistance 92 can be adjusted across the coil 56 to adjust the sensitivity of the torque motor 54 within the range of operation set at the bias wiper 76 to provide a fine adjustment.

In FIG. 2, an alternate arrangement is shown for production of the described compensation stresses within the machine. The base 10 in this embodiment includes an arch 94 therein and the cylinder 34 is horizontally oriented and fixed in the base 10 on one side of the arch 94. The piston rod 30 extends through the lower end of the arch 94 and is engaged against the portion of the base 10 on the side opposite the cylinder 34. As the pressure of fluid supplied behind the piston 32 is increased, the piston is shifted to tend to spread the arch 94. This has the same effect in the base 10 as does the lifting force produced on the base 10 as described in connection with the embodiment of FIG. 1. The control circuit of FIG. 3 will operate in the same manner in both embodiments. The piston rod 30 in the embodiment of FIG. 2 may be fixed to the base 10 at the side of the arch 94 opposite to the cylinder 34 and the piston 32 may be urged in a direction tending to close the arch 94 and to separate the wheels 12, 16 as the grinding load decreases to negatively apply the compensation stresses and to achieve the same compensation result. In this latter case the control circuit of FIG. 3 is modified to maintain the valve 50 in its fully closed position during conditions of no grinding load. However, in this case the compensation mechanism tends to maintain a full grinding load stress in the machine at all times over a predetermined range. The compensation stresses in this alternate form do not oppose the grinding stresses but nevertheless, by the appropriate magnitude control of them and their addition to the grinding stresses, the algebraic sum of stresses within the machine can be maintained constant over a predetermined range to produce the same result. It should be pointed out also that the use of an inductive pickup for the grinding load signal is a convenient method since the signal can be obtained at such a level that amplification is not required.

A device such as a strain gauge can be used in place of the motor load detector to measure the stress within the machine at a convenient location but an amplifier stage is required to raise the signal to a usable level. The strain gauge and amplifier will, however, perform an equivalent function and can be substituted in the circuit described to control the valve 50. In FIG. 6, a strain gauge 96 is shown attached to a surface of a rib 98 forming part of a yoke 100 in which the end of a screw 102 is axially fixed. The screw 102 is operable to position and move the slide 20 on the sub-slide 26 and during a grinding operation transmits the reactive forces of the operation to the yoke 100 and sub-slide 26. The sub-slide 26 is clamped securely to the base 10 in a fixed position during grinding operations. The reactive forces of the grinding operation flex the yoke 100 such that small changes in the dimensions of the rib 98 occur to alter the electrical characteristics of the strain gauge 96 and thereby produce a signal proportional to the grinding forces tending to separate the wheels 12, 16. The signal is small in magnitude and requires amplification to a usable level. In addition, the dimensions of machine members change with temperature changes and these thermal variations will require provision for temperature compensation. In the strain gauge mounting shown, the effect of temperature increases during operation of the machine are minimal since the rib 98 is fairly well removed from the areas of heat generation and has a large area of surface exposed for cooling purposes. Therefore its dimensional change due to temperature variation will be small.

In either of the embodiments shown herein or in the modifications described, the mechanism and its control are such that compensating stresses are created in the machine and the stresses of grinding are controlled to reduce greatly the "pinchout" phenomenon. This permits grinding within very close tolerances without scrapping of parts even when the grinding load varies during a continuous operation. To exemplify the results of this invention, the following test has been made on a machine constructed as described with reference to FIG. 1. A series of test parts of three-quarters of an inch in diameter and two inches long were ground in a through-feed operation with ten thousands of an inch stock removal, first without the compensation control circuit actuated and then with the compensation in effect. Without the compensation, the last three parts of a string of parts gradually decreased in final size four ten-thousands of an inch on their diameter from the diameter size of those parts which were ground while the grinding throat was maintained full. With the compensation applied, the last three parts of a string of parts passed through the machine were measured by the same instruments and were found to be the same size as the rest of the parts ground under full load conditions. The effect of this compensation system then is to produce a grinding machine which acts as if it had infinite rigidity.

What is claimed is:

1. In a centerless grinding machine having a grinding wheel and a regulating wheel spaced apart to define a grinding throat therebetween for grinding workpieces as they pass therethrough, the workpieces in the throat producing grinding stresses in the machine tending to separate said wheels, a compensation mechanism comprising:

(a) means to produce a signal proportional in magnitude to the amount of grinding stresses within the machine and variable therewith, (b) means to produce variable compensation stresses within the machine, and (c) means responsive to said signal and the magnitude thereof to control said compensation stress producing means to produce said compensation stresses of a magnitude tending to maintain the algebraic sum of said grinding and compensation stresses constant over a predetermined range.

2. In a centerless grinding machine having a grinding wheel and a regulating wheel spaced apart to define a grinding throat therebetween for grinding workpieces as they pass therethrough and structure to support the wheels, the workpieces in the throat producing grinding stresses tending to separate said wheels and transmitted to the supporting structure, a compensation mechanism comprising:
   (a) means to produce a signal proportional in magnitude to the amount of grinding stresses within the supporting structure,
   (b) a piston connected to the supporting structure to produce variable compensation stresses therein when fluid under variable pressure is applied thereto,
   (c) a fluid pressure line connected to apply pressure fluid to said piston, and
   (d) means variably to control the pressure of fluid in said line in response to said signal and magnitude thereof to produce compensation stresses of a magnitude tending to maintain the algebraic sum of said grinding and compensation stresses in the supporting structure constant over a predetermined range.

3. The grinding machine of claim 2 wherein:
   (a) the supporting structure includes a machine base comprised of two portions partially separated by a space,
   (b) said piston is enclosed within one base portion, and
   (c) a piston rod extends through said space and connects said piston to the other of said base portions.

4. In a centerless grinding machine having an electric grinding spindle motor, a grinding wheel rotated by the motor, a regulating wheel, and structure to support the wheels in a spaced apart relation to define a grinding throat therebetween for grinding workpieces as they pass therethrough, the workpieces in the throat producing grinding stresses tending to separate said wheels and transmitted to the supporting structure, said stresses reflected to the motor as a proportional increase in load thereon, a compensation mechanism comprising:
   (a) an inductive coupling element connected to the motor and having an electric signal output proportional in magnitude to the amount of motor load,
   (b) a piston connected to the supporting structure to produce variable compensation stresses therein when fluid under variable pressure is applied thereto,
   (c) a fluid pressure line connected to apply pressure fluid to said piston,
   (d) an electrically controllable valve connected to said pressure line and operated in response to said signal output and the magnitude thereof to vary the fluid pressure in said line and thereby to produce compensation stresses of a magnitude tending to maintain the algebraic sum of grinding and compensation stresses constant over a predetermined range.

5. In a centerless grinding machine having a grinding wheel and a regulating wheel spaced apart to define a grinding throat therebetween for grinding workpieces as they pass therethrough, the workpieces in the throat producing grinding stresses in the machine tending to separate said wheels, a compensation mechanism comprising:
   (a) means to produce a signal proportional to the amount of instantaneous grinding stress within the machine, and
   (b) means to produce compensation stresses within the machine in opposition to the grinding stresses in response to said signal, the magnitude of the compensation stresses being proportional to said signal over a predetermined range of grinding stress magnitudes.

6. In a centerless grinding machine having a base and a grinding wheel and a regulating wheel supported thereon and spaced apart to define a grinding throat therebetween for grinding workpieces as they pass therethrough, the workpieces in the throat producing grinding stresses in the machine tending to separate said wheels and transmitted to the base, a compensation mechanism comprising:
   (a) means to produce a signal proportional in magnitude to the amount of grinding stress within the machine,
   (b) a piston connected to the base and operable when fluid under pressure is applied thereto to produce compensation stresses within the base in opposition to the grinding stresses,
   (c) a fluid line connected to apply fluid under pressure to said piston, and
   (d) means variably to control the pressure of fluid in said line in direct proportion to the magnitude of said signal over a predetermined range thereof to produce compensation stresses tending to oppose the grinding stresses as the grinding stresses increase.

7. The grinding machine of claim 6 wherein:
   (a) said piston is contained in a cylinder
   (b) said cylinder is received inside of one portion of the machine base,
   (c) a piston rod connects said piston to another portion of the machine base, and
   (d) said machine base portions are partially separated by a space through which said piston rod extends.

8. The grinding machine of claim 6 wherein:
   (a) the grinding stresses tend to bend the machine base in one direction, and
   (b) said piston is connected to the machine base to produce compensation stresses tending to bend the machine base in a direction opposite to the direction of grinding stress bend.

9. In a centerless grinding machine having a base and a grinding wheel and a regulating wheel supported thereon and spaced apart to define a grinding throat therebetween for grinding workpieces as they pass therethrough, the workpieces in the throat producing grinding stresses in the machine tending to separate said wheels and transmitted to the base, a compensation mechanism comprising:
   (a) means to produce a signal proportional in magnitude to the amount of grinding stress within the machine,
   (b) a piston connected to the base and operable when fluid under pressure is applied thereto to produce compensation stresses within the base in opposition to the grinding stresses,
   (c) a fluid line connected to apply fluid under pressure to said piston to produce said compensation stresses in proportion to the pressure of fluid therein,
   (d) a control valve connected to said fluid line and defining a variable restriction fluid discharge duct therefrom, and
   (e) means to operate said control valve in response to said signal variably to restrict the fluid discharge duct from said line to control the fluid pressure therein whereby said compensation stresses are produced directly proportional to the grinding stresses over a predetermined range thereof.

10. In a centerless grinding machine having an electric grinding spindle motor, a base, and a grinding wheel rotated by the motor and a regulating wheel, both wheels supported on the base and spaced apart to define a grinding throat therebetween for grinding workpieces in the throat producing grinding stresses tending to separate said wheels and transmitted to the base as a bending stress therein in one direction, said stresses reflected to the motor as an increase in load thereon, a compensation mechanism comprising:
   (a) an inductive coupling device connected to the motor and having an output electric signal proportional in magnitude to the amount of motor load,
   (b) a piston connected to the base to produce a compensation bending stress therein opposite to said one direction of grinding bending stress when fluid under pressure is applied thereto, (c) a fluid line connected to apply fluid under pressure to said piston to produce said compensation bending stresses in proportion to the pressure of fluid therein, (d) a control valve connected to said fluid line and defining a variable restriction fluid discharge duct therefrom, (e) a torque motor connected to said valve for operation thereof in response to said electric signal to variably restrict the fluid discharge duct from said line to control the fluid pressure therein whereby said compensation bending stress is directly proportional to the grinding bending stress over a predetermined range of grinding stresses.

11. The centerless grinding mechanism of claim 10 wherein:

(a) means are connected to said torque motor to produce an electrical bias thereon to establish said predetermined range of grinding stresses, and (b) means are provided selectively to adjust said bias producing means to alter said predetermined range of grinding stresses.

12. In a machine tool having supporting structure to which two members are attached, the supporting structure and two members having less than infinite rigidity and being subjected to variable load stresses changing the spacing of the two members during operation of the machine tool, a compensation mechanism comprising in combination:

(a) means to produce an electrical signal proportional in magnitude to the load stresses, (b) compensation means operable to produce variable stresses to alter the spacing of the two members, and (c) control means responsive to said electrical signal to operate said compensation means to produce stresses to vary the spacing of the two members inversely as said load stresses whereby the effect of infinite rigidity is provided in the machine tool.

13. The mechanism of claim 12 wherein (a) said compensation means are operable to produce stresses in opposition to the load stresses, and (b) said control means are responsive to said electrical signal to operate the compensation means in direct proportion relative thereto.

14. The mechanism of claim 12 wherein (a) said compensation means are operable to produce stresses in the same direction as the load stresses, and (b) said control means are responsive to said signal to operate the compensation means in inverse proportion relative thereto.

15. In a machine tool having supporting structure to which a cutting tool and a workholding member are attached, the supporting structure, cutting tool and work holding member having less than infinite rigidity and being subjected to variable load stresses changing the relative spacing of the cutting tool and work holding member during operation of the machine tool, a compensation mechanism comprising in combination:

(a) an electrical device having a signal output proportional in magnitude to the load stresses, (b) a motor variably operable to produce stresses in the machine tool to alter the spacing of the cutting tool and work holding member, (c) an electrical control circuit responsive to said signal output to energize said motor and produce stresses in the machine tool to vary the spacing of said cutting tool and work holding member inversely as said load stresses to maintain the cutting tool and work holding member in a constant spaced relation to provide the effect of infinite rigidity in the machine tool.

16. The mechanism of claim 15 in which said electrical device is a strain gauge having electrical characteristics alterable in response to deflection of a portion of said machine supporting structure to produce a signal output.

References Cited by the Examiner

UNITED STATES PATENTS 2,168,596  8/39  Hall _____ 51—111
2,525,364  10/50  Mennesson _____ 51—103 X

FOREIGN PATENTS 857,971  1/61  Great Britain.
885,062  12/61  Great Britain.

LESTER M. SWINGLE, *Primary Examiner.*